US012537698B2

(12) United States Patent
Voit et al.

(10) Patent No.: US 12,537,698 B2
(45) Date of Patent: Jan. 27, 2026

(54) ADVERTISEMENT OF CONFIDENTIAL COMPUTING ENVIRONMENTS

(71) Applicant: Cisco Technology, Inc., San Jose, CA (US)

(72) Inventors: Eric Voit, Bethesda, MD (US); Pascal Thubert, Roquefort les Pins (FR); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 18/143,470

(22) Filed: May 4, 2023

(65) Prior Publication Data

US 2024/0372735 A1 Nov. 7, 2024

(51) Int. Cl.
*H04L 9/32* (2006.01)
*G06F 9/50* (2006.01)

(52) U.S. Cl.
CPC .......... *H04L 9/3273* (2013.01); *G06F 9/5044* (2013.01); *G06F 2209/501* (2013.01); *G06F 2209/503* (2013.01); *G06F 2209/509* (2013.01)

(58) Field of Classification Search
CPC ................. H04L 9/3273; G06F 9/5044; G06F 2209/501; G06F 2209/503; G06F 2209/509
See application file for complete search history.

(56) References Cited

U.S. PATENT DOCUMENTS

| 2014/0331309 A1 | 11/2014 | Spiers et al. |
| 2015/0264024 A1 | 9/2015 | Frank |
| 2017/0214694 A1 | 7/2017 | Yan |
| 2019/0140919 A1 | 5/2019 | Smith et al. |
| 2020/0097648 A1* | 3/2020 | Soriente .............. H04L 63/0421 |
| 2022/0171883 A1* | 6/2022 | Bursell ................... G06F 21/71 |
| 2023/0128099 A1* | 4/2023 | Nunez Mencias ...... G06F 21/53 726/26 |
| 2024/0007414 A1* | 1/2024 | Jain ........................ G06F 9/5088 |
| 2024/0276297 A1* | 8/2024 | Ma .......................... H04L 67/51 |

FOREIGN PATENT DOCUMENTS

WO WO2022026081 A1 2/2022

* cited by examiner

*Primary Examiner* — Tod R Swann
*Assistant Examiner* — Daniel Elahian
(74) *Attorney, Agent, or Firm* — Lee & Hayes, P.C.

(57) ABSTRACT

Techniques performed by offload computing devices that establish and advertise confidential computing environments for use by other computing devices. The offload computing devices may each be executing an attestable bootloader that creates the confidential computing environments, advertises the available resources to the other computing devices, establish secure encrypted channels with the other devices, and run processes in the confidential computing environments on behalf of the other computing devices. In addition to advertising the availability of computing resources in the confidential environments, the offload computing devices may additionally advertise performance metrics associated with the confidential computing environments. Computing devices may receive the advertisements, and send requests to the offload computing devices to run processes on their behalf in the confidential computing environments.

20 Claims, 11 Drawing Sheets

ADVERTISEMENT OF CONFIDENTIAL COMPUTING ENVIRONMENTS

TECHNICAL FIELD

The present disclosure relates generally to techniques performed by offload computing devices that advertise confidential computing environments for use by computing devices to offload processes for execution.

BACKGROUND

As the types of personal computing devices continues to proliferate, and the functionality of these devices continues to become more complex. For example, the applications that run on certain computing devices, such as virtual reality glasses, smart phones, and personal medical devices, can be resource-heavy and power-intensive, and the information being processed by the applications is often private or otherwise sensitive to users. Many of these devices are battery powered, and the processing and battery requirements of these applications can limit the functionalities of these devices, the performance of these devices, and the duration of the experience provided by these devices. In light of these constraints, it may be advantageous to offload processing from these devices elsewhere to obtain sufficient computing resources to provide improved experiences and functionality for users.

Various types of cloud systems have emerged as avenues to provide computing resources on which computing devices can offload their processing requirements. For latency- and privacy-sensitive devices or applications, local clouds have become a popular choice for devices to use when offloading processing. Local clouds are a type of cloud computing infrastructure that is geographically closer to the users they serve. In contrast to traditional cloud computing that relies on remote data centers, local clouds are often located within a local area network, such as a residential, enterprise, or campus network. This allows for faster access to data and applications, as well as improved performance, as compared to traditional cloud computing. In addition to improved performance and lower latency, local clouds provide increased control over security and privacy by reducing the risk of data breaches. However, when the processing of user data is offloaded into local clouds (or other available computing resources), users may not want the owners or managers of the local clouds to be able to view their experiences or data that is being run or processed in the local clouds.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
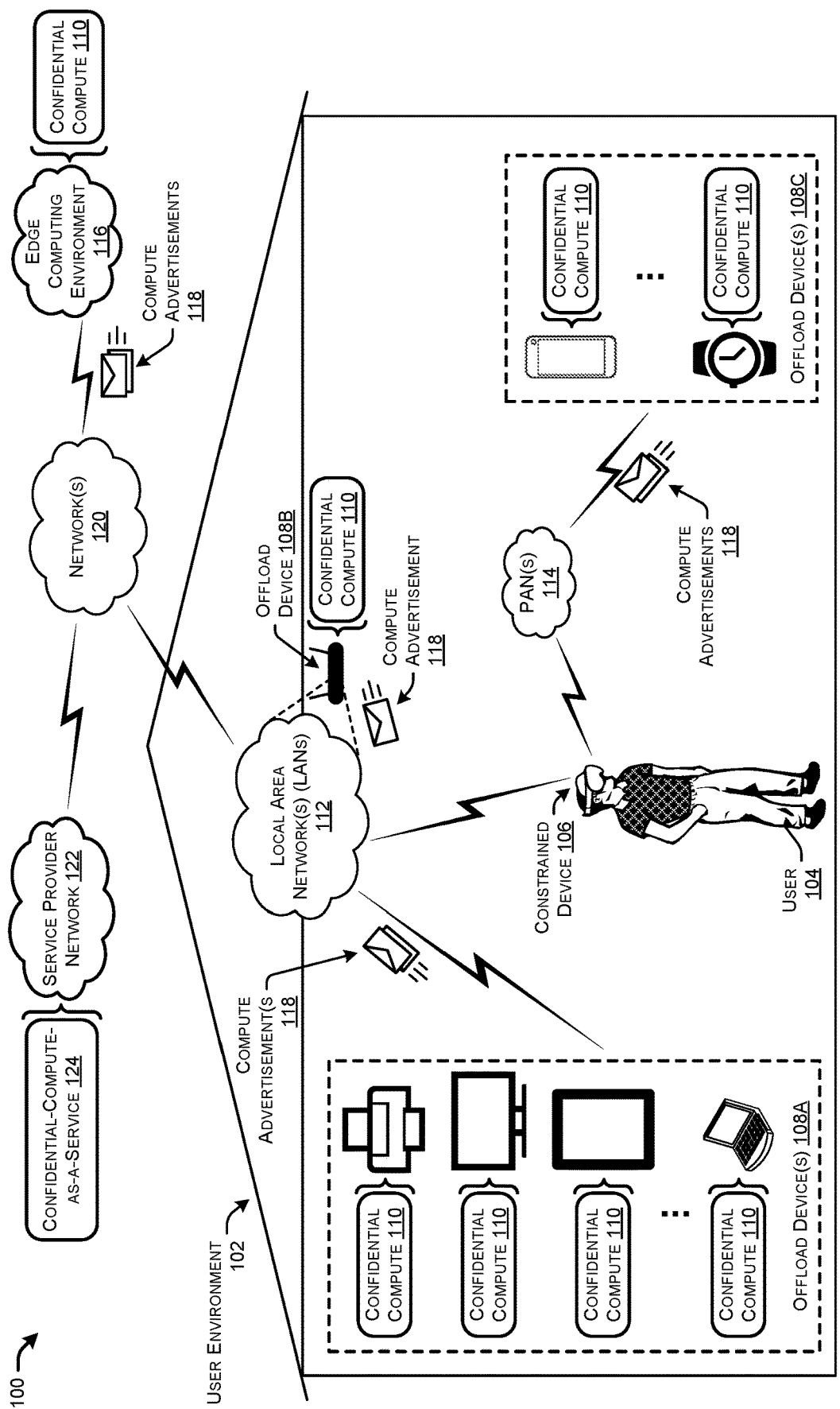
FIG. 1 illustrates a system-architecture diagram of an example user environment where a resource constrained device selects an offload device on which to run a process in a confidential computing environment on behalf of the constrained device.

This disclosure describes techniques for offload devices to provide and advertise available computing resources in confidential computing environments for use by computing devices to run processes.

A first method described herein may be performed by an offload computing device that provides computing resources in a confidential computing environment for use by other computing devices includes identifying available computing resources of the offload computing device that are available for use by the other computing devices. Further, the first method may include sending, via one or more networks, advertisement messages to the other computing devices. In some instances, the advertisement messages indicate the available computing resources in the confidential computing environment. Additionally, the first method may include receiving a request to run a process on the available computing resources on behalf of a particular computing device. Further, the first method may include running the process on the available computing resources in the confidential computing environment on behalf of the particular computing device.

A second method described herein may be performed by a computing device that determines to run a process on an offload computing device that provides computing resources in a confidential computing environment. The second method may further include receiving a first advertisement message from a first offload computing device. In some instances, the first advertisement message indicates first computing resources of the first offload computing device that are available to run the process in a first confidential computing environment. The second method may also include determining to run the process on the first computing resources, and sending, to the first offload computing device, a request to run the process on the first computing resources in the first confidential computing environment.

Additionally, the techniques described herein may be performed by a system and/or device having non-transitory computer-readable media storing computer-executable instructions that, when executed by one or more processors, performs the method described above.

Example Embodiments

This disclosure describes techniques performed by offload computing devices that establish and advertise confidential computing environments for use by other computing devices. The offload computing devices may each be executing an attestable bootloader that creates the confidential computing environments, advertises the available resources to the other computing devices, establish secure encrypted channels with the other devices, and run processes in the confidential computing environments on behalf of the other computing devices. In addition to advertising the availability of computing resources in the confidential environments, the offload computing devices may additionally advertise performance metrics associated with the confidential computing environments. The performance metrics may include one or more metrics such as bandwidth and/or latency metrics for connections between the offload computing device and the computing devices, central processing unit (CPU) speed metrics of processors supporting the confidential computing environments, security metrics indicating measures of security of the confidential computing environments, or indications of libraries of confidential code loadable by the offload computing devices. Computing devices may receive the advertisements, and send requests to the offload computing devices to run processes on their behalf in the confidential computing environments.

As noted above, as computing devices continue to become more complex, the functionalities provided by these devices, and the duration of the functionalities provided by the devices, can be constrained due to lack of available computing resources (e.g., CPU, memory, storage), lack of power (e.g., battery life), or other constraints. However, these constrained devices may be connected or otherwise have access to computing devices with available computing resources and power (referred to herein as "offload devices"). For example, a user may be using a virtual reality (VR) headset in a home environment that is connected to the Internet over a Wi-Fi network provided by an access point in the house. Thus, the VR headset may be connected to the access point, and potentially other devices connected to the Wi-Fi network, such as printers, laptop computers, tables, and televisions. Additionally, or alternatively, the VR headset may have other personal area network (PAN) connections with offload devices, such as Bluetooth connections with mobile phones or other wearable devices. Accordingly, the VR headset, which may be resource constrained, may be connected to other devices that are unused or at least have available computing resources and power sources. According to the techniques described herein, the VR headset may be able to harness the available computing resources and/or power of the offload devices by offloading processes and thus improving user experience.

According to the techniques described herein, offload devices with available computing resource (e.g., CPU, memory, storage, GPU, bandwidth, power source(s), etc.) may be configured to run processes on behalf of other computing devices, such as constrained devices. Each offload device may be configured to run a confidential compute boot loader (often referred to herein as an "attestable loader") that performs various operations of this invention. For instance, each offload device may run the attestable loader in a trusted execution environment (TEE), or a secure area of a processor that guarantees confidentiality and integrity of the data and processes running therein. The attestable loader may determine availabilities of computing resources of the offload devices, as well as other performance metrics for the offload devices (e.g., bandwidth and latency metrics, CPU speeds, graphics processing unit (GPU) availability, security metrics, etc.), and send advertisements to connected devices indicating the available computing resources and associated metrics.

In some instances, the confidential-compute advertisements generated and sent by the attestable loaders may be periodically and dynamically sent across networks to which the offload devices are connected. The advertisements may be layer-2 aware advertisements (e.g., mobile ad hoc network protocol (MANET), wireless ad hoc network protocol (WANET), Bonjour, Service Advertisement Framework protocols (SAF), etc.), and/or layer-3 type advertisements. In some instances, the attestable bootloaders may initiate and send the advertisements periodically or continuously, and in some examples, the attestable bootloaders may generate and send the advertisements in response to receiving requests for computing resources from constrained devices.

In examples where constrained devices are connected to multiple offload devices, the constrained devices may be configured to arbitrate between the offload devices and select an offload device that is optimal for running the particular process or handling the particular data. For instance, an offload device with a GPU may be selected by a constrained device that is offloading a graphics or video process. As another example, an offload device with low latency may be selected by a constrained device that is offloading a latency-sensitive process (e.g., video/audio chat, video game, etc.). When a constrained device determines that it would like to offload a process or data onto an offload device, the constrained device may select an available and/or optimal offload device on which to run the process and perform various techniques for offloading the process.

The attestable bootloaders may be configured to prove to the constrained devices that the execution environment of the offload devices are confidential and secure. For instance, when the attestable bootloader is queried externally by a constrained device, the attestable bootloader may provide that it is running in a confidential compute space using, for example, remote attestation. In some instances, the hardware signatures in the CPU chips may be used in various remote attestation protocols where the signatures can be used to state and certify the exact binary identity or exact binary of the software running in the TEE, including the attestable bootloader.

Once the constrained device has determined to offload a process onto an offload device, the devices may build a mutually authenticated secure channel, such as by using a Diffie-Hellman key exchange over the connections. The key(s) exchanged during this exchange method may then be used to encrypt subsequent communications (e.g., using a symmetric-key cipher) such that any processes or data exchanged between the devices are secure and not visible to parties other than the offload and constrained devices. Using this secure channel, the offload device may dynamically load an application from the constrained device and run that application to process data on behalf of the constrained device. The devices may maintain the secure channel and pass data back-and-forth depending on the type of process and/or data that is offloaded from the constrained device and to the offload device. In some instances, the attestable bootloader may allow more than one trusted user to use the same confidential application if requested by the different constrained devices.

In some examples, the attestable loader may verify that various aspects of the confidential compute environment are not externally visible, such as verifying Random Access Memory (RAM) exchanges, persistent storage verification, and networking verification. In this way, the users of constrained devices may be able to verify that their offloaded processes or experiences are not externally visible.

Although the techniques are described herein as being performed by "constrained devices," the devices that are offloading processes or data need not necessarily be constrained in any aspects, but may simply prefer to run processes or store data on other devices for various reasons. Thus, constrained devices described herein may not be constrained in all examples. Further, while it may be advantageous for the offload devices to be located in close proximity to the constrained devices (e.g., connected via local area networks (LANs) or PANS), the offload devices could be located in other semi-remote or remote locations (e.g., edge computing, data centers, etc.). In some instances, the attestable loader may be open sourced and Secure Hash Algorithm (SHA) 256-bit checksums (or similar) may be provided for released versions of the attestable loader such that users can verify that no backdoors exist in the codebase of the attestable loaders running in the TEEs.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example user environment 102 where a user 104 operates a resource constrained device 106 that selects an offload device 108 on which to run a process in confidential compute 110 (or "confidential computing environment") on behalf of the constrained device 106.

The user environment 102 may comprise any type of environment, such as house or personal residence, public buildings, enterprise buildings or environments, and so forth. Although the constrained device 106 is illustrated as smart glasses or VR glasses, the constrained device 106 may generally comprise any type of computing device, such as personal user devices (e.g., desktop computers, laptop computers, phones, tablets, wearable devices, entertainment devices such as televisions, etc.), network devices (e.g., servers, routers, switches, access points, etc.), and/or any other type of computing device. The user 104 may be using a VR headset or other constrained device 106 in the user environment 102 where the constrained device 106 may be connected to various offload devices 108.

In some examples, an offload device 108B may be an access point that creates a LAN 112 (e.g., a Wi-Fi network) to which other offload devices 108A in the user environment 102 are connected. Additionally, or alternatively, the constrained device 106 may be connected to offload devices 108C over one or more PANs 114 (e.g., Bluetooth, ZigBee, etc.). As illustrated, the offload devices 108A may comprise various types of devices, such as a printer, television, table, laptop (e.g., offload devices 108A) that are connected to the constrained device 106 via the LANs 112. Further, the offload device 108B may be an access point or router that provides the LANs 112 over which the devices communicate.

In some examples, other types of offload devices 108 may be used to run processes and/or store data on behalf of the constrained device 106, such as an edge computing environment 116. The edge computing environment 116 may be a computing architecture that include local edge servers of distributed computing environments closer in proximity to the constrained devices 106. The close proximity between the edge computing environment 116 and the constrained device 106 may provide lower latency and better bandwidth availability compared to traditional cloud architectures. The constrained device 106 may communicate with the edge computing environment 116 over one or more networks 120 (e.g., the Internet or other Wide Area Networks (WANs), campus networks, enterprise networks, etc.).

The offload devices 108 that have available computing resource (e.g., CPU, memory, storage, GPU, bandwidth, power source(s), etc.) may be configured to run processes on behalf of constrained devices 106. For instance, each offload device 108 may be configured to provide confidential compute 110 in which a confidential compute boot loader (often referred to herein as an "attestable loader") performs various operations of this invention. For instance, each offload device 108 may run the attestable loader in a trusted execution environment (TEE), or a secure area of a processor that guarantees confidentiality and integrity of the data and processes running therein. The attestable loader may determine availabilities of computing resources of the offload devices 108, as well as other performance metrics for the offload devices 108 (e.g., bandwidth and latency metrics, CPU speeds, GPU availability, security metrics, etc.), and send compute advertisements 118 to connected devices indicating the available computing resources and associated metrics.

In some instances, the compute advertisements 118 generated and sent by the offload devices 108 may be periodically and dynamically sent across networks to which the offload devices 108 are connected. The advertisements may be layer-2 aware advertisements (e.g., MANET, WANET, Bonjour, SAF, etc.), and/or layer-3 type advertisements. In some instances, the attestable bootloaders may initiate and send the advertisements periodically or continuously, and in some examples, the attestable bootloaders may generate and send the advertisements in response to receiving requests for computing resources from constrained devices 106.

In examples where constrained devices 106 are connected to multiple offload devices 108, the constrained devices 106 may be configured to arbitrate between the offload devices 108 and select an offload device 108 that is optimal for running the particular process or handling the particular data. For instance, an offload device 108 with a GPU (e.g., mobile phone) may be selected by a constrained device 106 that is offloading a graphics or video process. As another example, an offload device 108B (e.g., access point) with low latency may be selected by a constrained device that is offloading a latency-sensitive process (e.g., video/audio chat, video game, etc.). When a constrained device 106 determines that it would like to offload a process or data onto an offload device 108, the constrained device 106 may select an available and/or optimal offload device 108 on which to run the process and perform various techniques for offloading the process.

The attestable bootloaders may be configured to prove to the constrained devices 106 that the execution environment of the offload devices 108 are confidential and secure. For instance, when the attestable bootloader is queried externally by a constrained device, the attestable bootloader may provide that it is running in confidential compute 110 using, for example, remote attestation. In some instances, the hardware signatures in the CPU chips may be used in various remote attestation protocols where the signatures can be used to state and certify the exact binary of the software running in the TEE or other confidential compute 110, including the attestable bootloader. In some instances, the attestation operation may be symmetrical where a constrained device 106 also provides that it is trustable.

Once the constrained device 106 has determined to offload a process onto an offload device 108, the devices may build a mutually authenticated secure channel, such as by using a Diffie-Hellman key exchange over the connections. The key(s) exchanged during this exchange method may then be used to encrypt subsequent communications (e.g., using a symmetric-key cipher) such that any processes or data exchanged between the devices are secure and not visible to parties other than the offload and constrained devices. Using this secure channel, the offload device 108 may dynamically load an application from the constrained device 106 and run that application to process data on behalf of the constrained device 106. The devices may maintain the secure channel and pass data back-and-forth depending on the type of process and/or data that is offloaded from the constrained device and to the offload device. In some instances, the attestable bootloader may allow more than one trusted user to use the same confidential application if requested by the different constrained devices.

In some examples, the attestable loader may verify that various aspects of the confidential compute environment are not externally visible, such as verifying Random Access Memory (RAM) exchanges, persistent storage verification, and networking verification. In this way, the users of constrained devices may be able to verify that their offloaded processes or experiences are not externally visible.

In some instances, multiple offload devices 108 may be used by a constrained device 106 and the offload devices 108 may be arranged in various topologies. For instance, a constrained device 106 may leverage several offload devices 108 (e.g., in case a single offload device 108 does not offer sufficient performance, or in case the offload devices 108 offer different capabilities—e.g., specific types of hardware acceleration for different functions). Further, offload devices 108 could themselves serve as a client to another offload device 108 (e.g., in case an offload device 108 is too loaded to service a particular request or service level agreement (SLA)), leading to tethered or even more complex topologies.

It should be noted that there are many embodiments beyond VR use cases One example is the boot loader and offload application could run on a CPU in a smartphone. The offload application would only serve (personal) body sensor devices, e.g., reading biometrics. In that embodiment, medical sensor readings can be associated with the user 104 (e.g., patient) using bio-metric authentication, and the other bio readings are interpreted by the attested application in the phone (e.g., offload device 108C) CPU, forming the first vector (directed edge) of a graph of trust. The phone application could suffice by itself, e.g., to alert locally if an anomaly is detected, or alternatively, it could need more compute as a service e.g., in the cloud, found and attested over an overlay, such as via a relay agent. The method described in this invention may recurse, adding another component to the trusted graph in a serial fashion northwards client→local_app→cloud_app. This may be done by chaining the phone (e.g., offload device 108C) to a cloud (e.g., service provider network 122) via a second Mutually Authenticated Secure Channel. Alternatively, the phone (e.g., offload device 108C) could offload, gather, and correlate information from multiple body sensors in a tree fashion like client→local_app←client. For each sensor, the body measurement can be used (e.g., by correlation, artificial intelligence, etc.) to ensure that the sensor keeps measuring the same person. The symmetric attestation could then guarantee that the sensor is not "lying," at which point the common offloaded application can correlate and fuse the reading to refine the medical diagnostic.

In instances where multiple devices share the same application in the phone, that application may use data from all users 104 and optionally share the information or the results with the other users 104. This way, the loaded application can act as a trusted aggregator and relay, providing a configurable degree of east-west isolation. All of this information could be protected by confidential compute 110 from being read by anyone else within the local device. If multiple phone applications (e.g., in the same group identifier) share the same cloud trusted offload application, the information can be anonymized e.g., for use by medical research. This anonymization provides northwards isolation, and it is known that all the individual element of information are trustable. As shown in this embodiment, the method to establish a trust (directional) vector or (bidirectional) edge between a constrained device 106 and an application running in a confidential compute 110 can be used iteratively to build a graph of such vectors/edges with tunable isolation properties at each vertice.

In some instances, a service provider network 122 (e.g., cloud provider, software-as-a-service (Saas) platform, etc.), may run and provide a confidential-compute-as-a-service (CCaaS) 124 that manages at least portions of the techniques described herein. For instance, the CCaaS 124 may provide and manage the attestable loaders that run in the confidential compute 110 of the offload devices 108. In some instances, the CCaaS 124 may orchestrate or perform some of the techniques described herein, such as by generating and sending at least some of the compute advertisements 118, (e.g., receive or monitor availability and performance metrics), orchestrating or establishing the secure channels, and/or managing other aspects of the techniques described herein.

In some instances, the edge computing environment 116 and/or other offload devices 108 may be devices located in one or more data centers that may be located at different physical locations. For instance, the edge computing environment 116 and/or other offload devices 108 may be supported by networks of devices in a public cloud computing platform, a private/enterprise computing platform, and/or any combination thereof. The one or more data centers may be physical facilities or buildings located across geographic areas that designated to store networked devices used as offload devices 108. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the distributed application architecture may not be located in explicitly defined data centers, but may be located in other locations or buildings.

The edge computing environment 116 and/or other offload devices 108 may be accessible to client devices 106 over one or more networks 120, such as the Internet. The edge computing environment 116, service provider network 122, and the networks 120, may each respectively include one or more networks implemented by any viable communication technology, such as wired and/or wireless modalities and/or technologies. The edge computing environment 116, service provider network 122, and the networks 120 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The edge computing environment 116, service provider network 122, and the networks 120 may include devices, virtual resources, or other nodes that relay packets from one network segment to another by nodes in the computer network.

Figure 2:
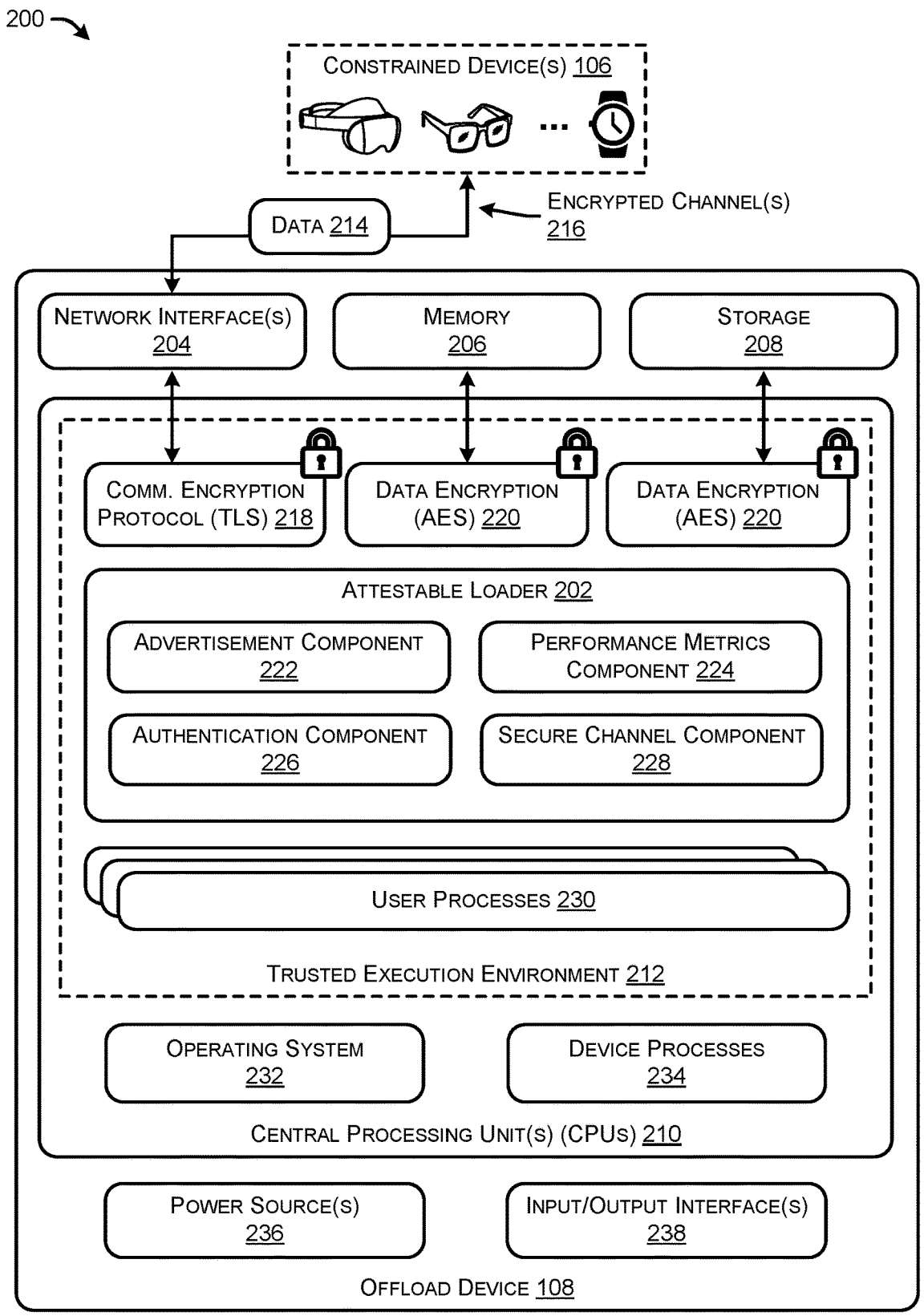
FIG. 2 illustrates a component diagram of an offload device that has a trusted execution environment in which an attestable loader runs processes on behalf of constrained devices.

FIG. 2 illustrates a component diagram 200 of an offload device 108 that has a trusted execution environment in which an attestable loader runs processes on behalf of constrained devices 106. As shown, an attestable loader 202 may be running on the offload device 108 in order to perform various operations described herein. The attestable loader 202 may be launched and run in a confidential compute 110, such as a TEE 212.

As illustrated, the offload device 108 includes one or more network interfaces 204 that enable the offload device 108 to communicate over wired and/or wireless networks. The network interface(s) 204 may include devices configured to couple to personal area networks (PANs), wired and wireless local area networks (LANs), wired and wireless wide area networks (WANs), Campus Area Networks (CANs), Metropolitan Area Networks (MANs), extranets, intranets, the Internet, short-range wireless communication networks (e.g., ZigBee, Bluetooth, etc.)-both centralized and/or distributed—and/or any combination, permutation, and/or aggregation thereof. The network interface(s) 204 may include a wireless or Wi-Fi network communications interface, an Ethernet communications interface, a cellular network communications interface, a Bluetooth communications interface, etc., for communications with devices over various types of networks 112, 114, and/or 120. In the case of a wireless communications interfaces, such interfaces may include radio transceivers and associated control circuits and logic for implementing appropriate communication protocols.

The offload device 108 may further include memory 206, such as computer-readable media, that may include volatile and nonvolatile memory, removable and non-removable media implemented in any method or technology for storage of information, such as computer-readable instructions, data structures, program component, or other data. Such memory 206 may include, but is not limited to, RAM, dynamic RAM, static RAM, SDRAM, cache memory, read-only memory, or any other medium which can be used to store the desired information and which can be accessed by a computing device. The memory 206 may be implemented as computer-readable storage media ("CRSM"), which may be any available physical media accessible by processor(s) (e.g., CPU(s) 210) to execute instructions stored on the memory 206. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The offload device 108 may further include storage 208 (e.g., long-term storage), which may be ROM, EEPROM, hard disk drives (HDDs), solid state drives (SSDs), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by the offload device 108.

As illustrated, the attestable loader 202 may be running in a TEE 212 of the CPU(s) 210. The CPU(s) 210 may include one or more hardware processors 1004 (processors) configured to execute one or more stored instructions. The CPU(s) 210 may comprise one or more cores, and the cores may be of different types. For example, the CPU(s) 210 may include application processor units, graphic processing units (GPUS), and so forth. In one implementation, the CPU(s) 210 may comprise a microcontroller and/or a microprocessor. The CPU(s) 210 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the CPU(s) 210 may possess its own local memory, which also may store program components, program data, and/or one or more operating systems.

The TEE 212 may be an area on the CPU(s) 210 that is separated from the offload device's 108 main operating system 232. The TEE 212 may ensure that data is stored, processed, and protected in a secure environment. The TEE 212 may be a confidential and secure architecture that is protected using hardware-based encryption that isolates processes running in the TEE 212. In some instances, the TEE 212 may include private regions or portions of the memory 206, or "enclaves," that are designed to be protected and allowed isolated execution.

The TEE 212 may utilize or execute communications encryption protocols 218, such as transport layer security protocol (TLS), secure socket layers protocol (SSL), etc., that encrypt data communicated using the network interface(s) 204. As illustrated, the offload device 108 may utilize the communication encryption protocol 218 to establish encrypted channel(s) 216 with constrained devices 106 in order to communicate data 214 back-and-forth between the devices. Further, the TEE 212 may utilize or execute various data encryption algorithms 220, such as Advanced Encryption Standard (AES), that is used to encrypt data stored in the memory 206 and storage 208.

The attestable loader 202 may run in the TEE 212 and include components (e.g., executable code, computer-readable data, etc.) or functionality for performing various operations described herein, for instance, the attestable loader 202 may include an advertisement component 222 that generates and sends the compute advertisements 118 across networks or connections that have been established with the offload device 108. In some instances, the compute advertisements 118 generated and sent by the advertisement component 222 may be periodically and dynamically sent across networks to which the offload device 108 is connected. The compute advertisements 118 may be layer-2 aware advertisements (e.g., MANET, WANET, Bonjour, SAF, etc.), and/or layer-3 type advertisements. In some instances, the advertisement component 222 may initiate and send the compute advertisements 118 periodically or continuously, and in some examples, the advertisement component 222 may generate and send the compute advertisements 118 in response to receiving requests for computing resources from constrained devices 106.

The attestable loader 202 may further include a performance metrics component 224 configured to determine amounts of available computing resource (e.g., CPU, memory, storage, GPU, bandwidth, power source(s), etc.) of the offload device 108, as well as other performance metrics for the offload devices (e.g., bandwidth and latency metrics, CPU speeds, graphics processing unit (GPU) availability, security metrics, etc.). The resource availabilities and/or performance metrics may be sent in the compute advertisements 118 by the advertisement component 222.

The attestable loader 202 may further include an authentication component 226 configured to perform various authentication techniques around the TEE 212. For instance, the authentication component 226 may be configured to prove to the constrained devices 106 that the TEE 212 is confidential and secure. For instance, when the authentication component 226 is queried externally by a constrained device 106, the authentication component 226 may provide that it is running in the TEE 212 or another a confidential compute 110 using, for example, remote attestation. In some instances, the hardware signatures in the CPU(s) 210 may be used in various remote attestation protocols where the signatures can be used to state and certify the exact binary of the software running in the TEE 212 or other confidential compute 110, including the attestable bootloader. In some instances, the attestation operation may be symmetrical where a constrained device 106 also provides that it is trustable.

The attestable loader 202 may further include a secure channel component 228 that may build a mutually authenticated secure channel (e.g., encrypted channel(s) 216) with a constrained device 106, such as by using a Diffie-Hellman key exchange over the connections. The key(s) exchanged during this exchange method may then be used to encrypt subsequent communications (e.g., using a symmetric-key cipher) such that any processes or data exchanged between the devices are secure and not visible to parties other than the offload and constrained devices. Using this secure channel 216, the offload device 108 may dynamically load an application from the constrained device 106 and run that application to process data 214 on behalf of the constrained device 106. The devices may maintain the secure channel 216 and pass data back-and-forth depending on the type of process and/or data that is offloaded from the constrained device 106 and to the offload device 108. In some instances, the attestable loader 202 may allow more than one trusted user to use the same confidential application if requested by the different constrained devices 106.

In some examples, the authentication component 226 may verify that various aspects of the confidential compute 110 are not externally visible, such as verifying RAM exchanges, persistent storage verification, and networking verification. In this way, the users 104 of constrained devices 106 may be able to verify that their offloaded processes or experiences are not externally visible. The attestable loader 202 may then execute and manage user processes 230 that run in the TEE 212 on behalf of constrained devices 106.

The CPU(s) 210 my further execute an operating system (OS) 232 of the offload device 108 where the OS 232 manages the hardware and software resources of the offload device 108. The OS 232 may comprise any type of OS and perform tasks such as memory management, processor management, input/output device management (e.g., keyboards, mice, printers, displays, etc.), file management, security management, and user interfacing. The OS 232 may help run various device processes 234 of the offload device 108, such as operations performed by the offload devices 108 to perform various functionality of the different types of devices.

The offload device 108 may further include one or more power sources 236, such as battery power sources, alternating current (AC) power sources (e.g., mains power), USB ports, power banks, wireless charging, direct current (DC) power sources, etc. Further, the offload device 108 may include one or more input/output interfaces 238, including but not limited to one or more of keyboards and mice, touchscreens and displays, speakers, headphones, microphones, cameras, printers, external storage devices, communication interfaces, etc.

Figure 3:
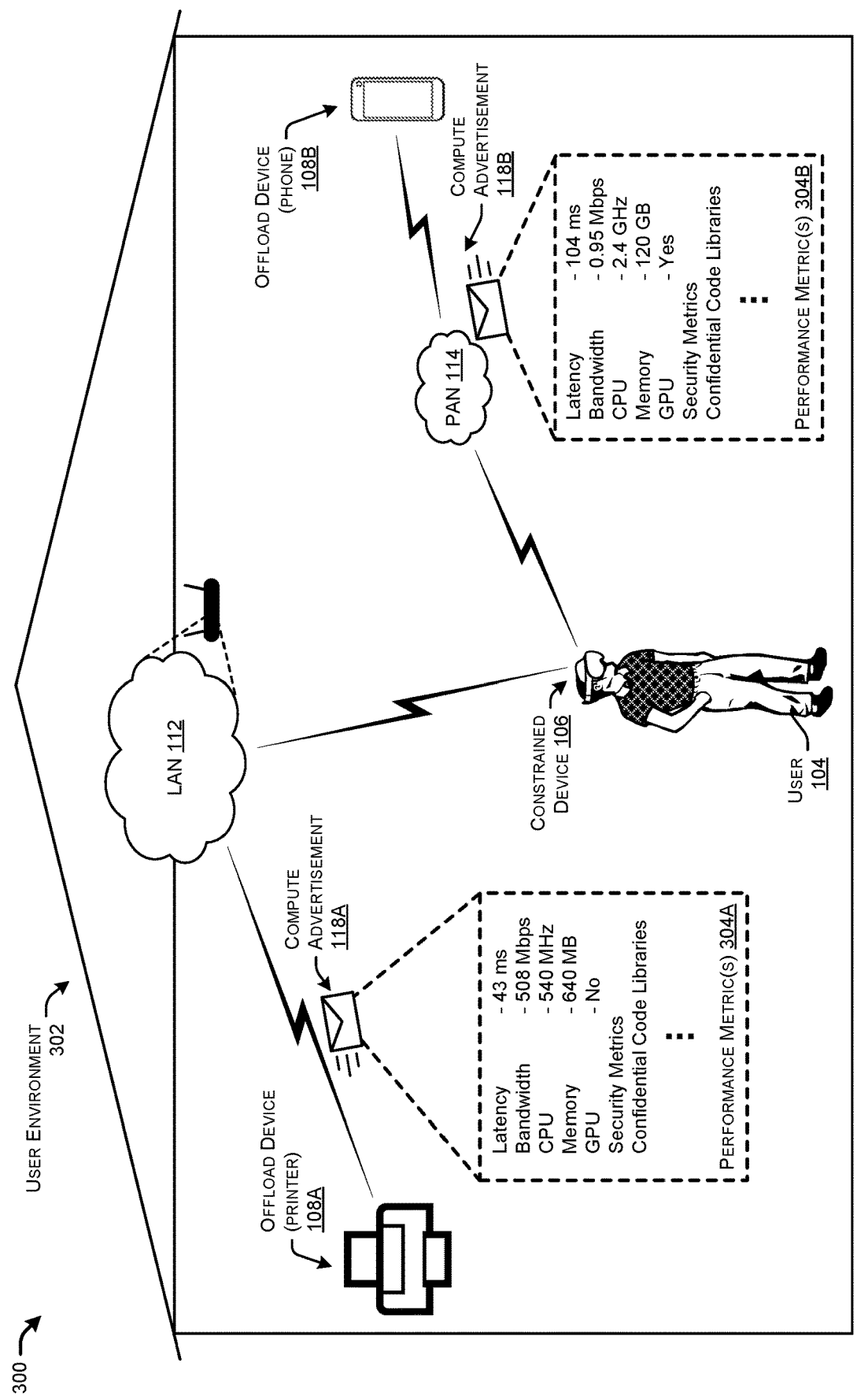
FIG. 3 illustrates a system-architecture diagram of an example user environment where a resource constrained device selects between multiple offload devices on which to run a process based on performance metrics of the offload devices.

FIG. 3 illustrates a system-architecture diagram 300 of an example user environment 302 where a resource constrained device 106 selects between multiple offload devices 108A and 108B on which to run a process based on performance metrics of the offload devices 108. As illustrated, the offload device 108A (e.g., may generate and second a compute advertisement 118A over the LAN 112 and to the constrained device 106. Similarly, the offload device 108B may generate and send a compute advertisement 118B over a PAN 114 and to the constrained device 106. The compute advertisements 118 may each include one or more performance metrics 304 for the different offload devices 108. As illustrated, the compute advertisements 118 may indicate one or more of latency, bandwidth, CPU speed, memory availability, availability of a GPU, security metrics, indications of confidential code libraries, and/or other performance metrics 304A. The constrained device 106 may receive the computer advertisements 118 and determine which of the offload devices 108 is optimal for offloading processes. In some instances, the constrained device 106 may offload one or more processes onto offload device 108A (e.g., processes with high security concerns), and also offload one or more different processes onto offload device 108B (e.g., processes that would benefit from a GPU).

Figure 4A:
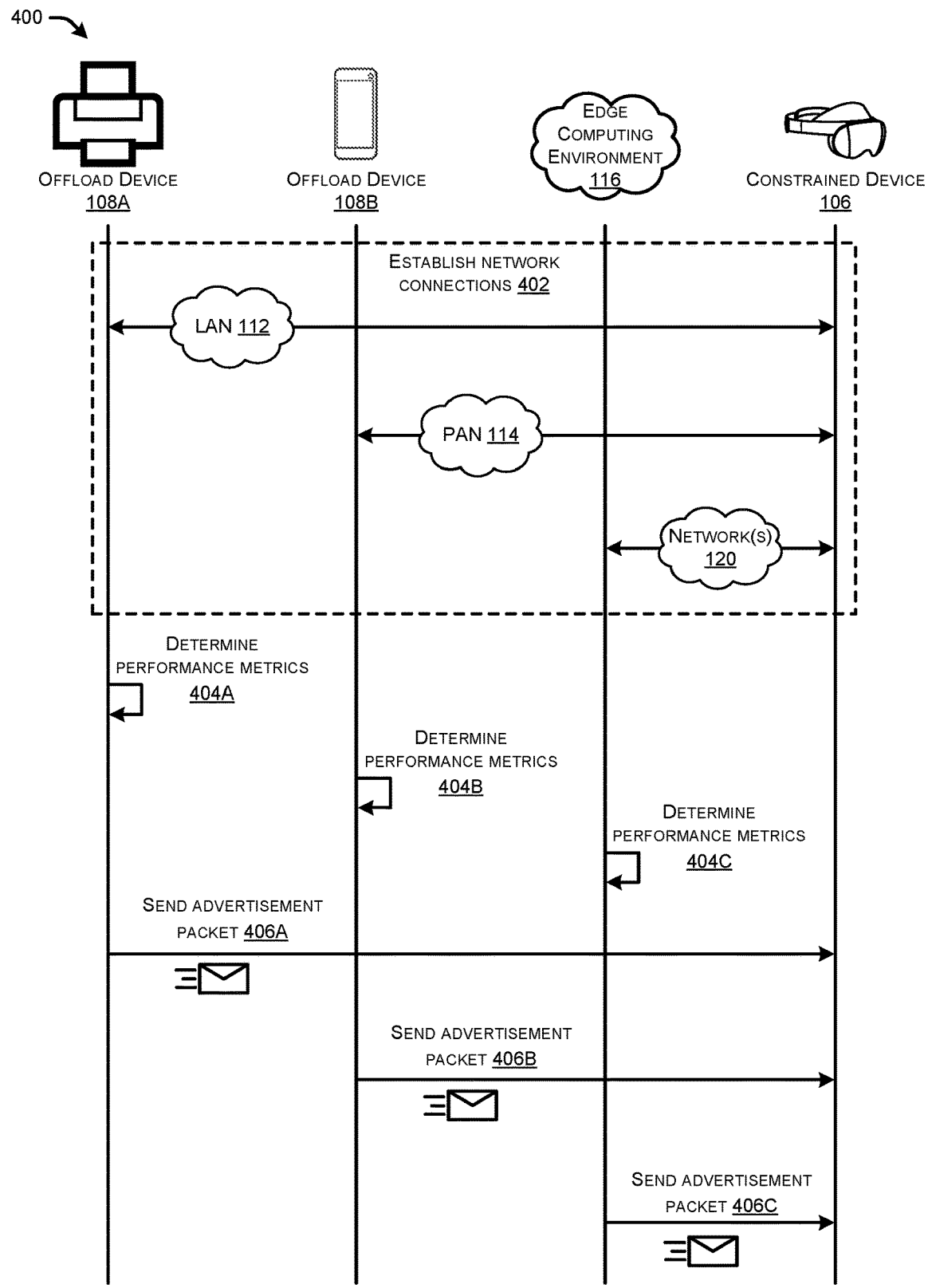
FIGS. 4A and 4B collectively illustrate a flow diagram of example communications session between offload devices and a constrained device where the constrained device selects an offload device on which to run a process in a confidential computing environment.
Figure 4B:
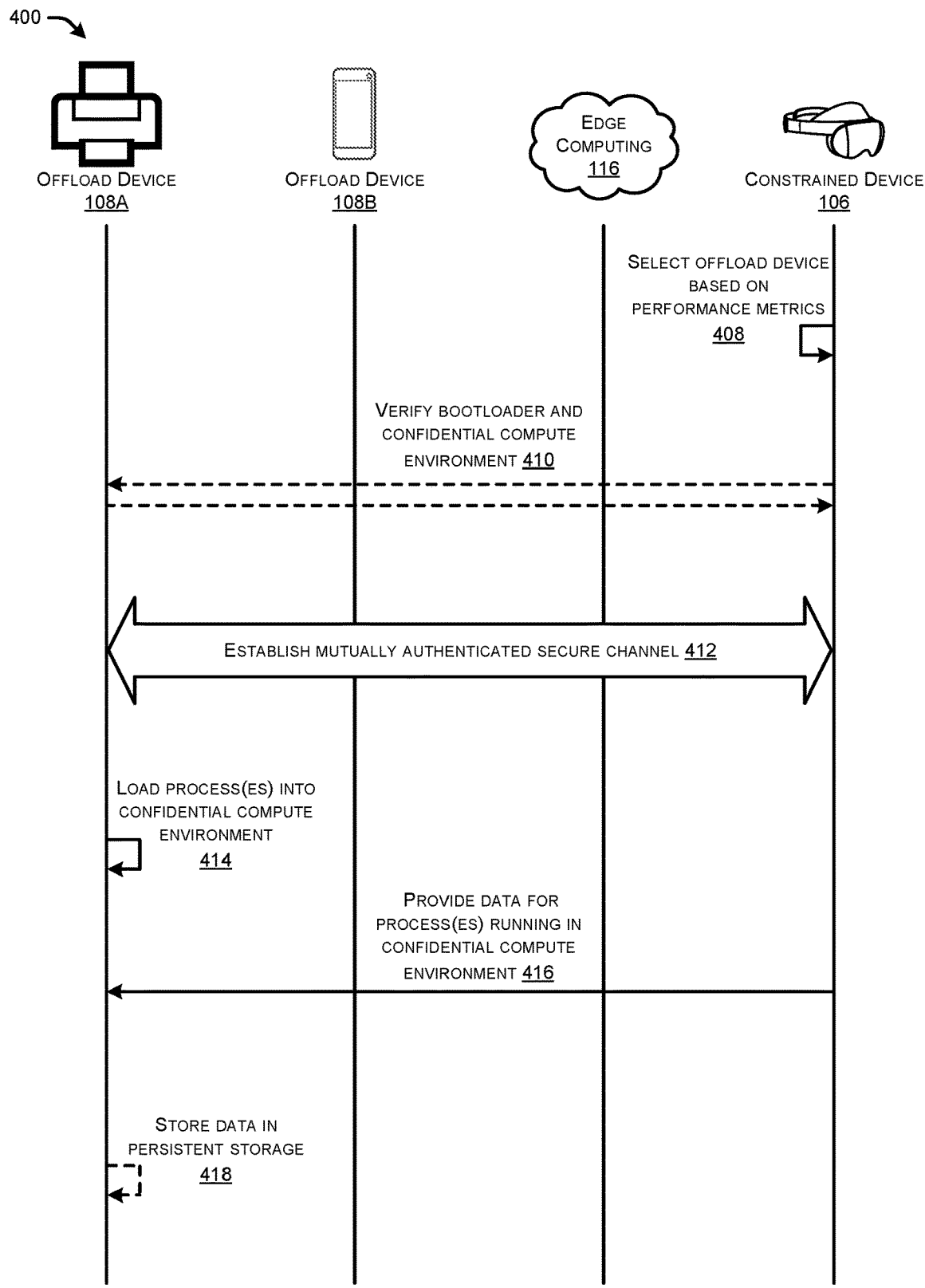

FIGS. 4A and 4B collectively illustrate a flow diagram 400 of example communications session between offload devices 108 and a constrained device 106 where the constrained device 106 selects an offload device 108 on which to run a process in confidential compute 110.

At 402, the constrained device 106 may establish network connections with the offload devices 108A and 108B as well as the edge computing environment 116. At 404, the offload devices 108A and 108B and the edge computing environment 116 may each determine one or more performance metrics 304 indicating a performance or attributes of the edge computing environment 116 and offload devices 108.

At 406, the offload devices 108A and 108B and the edge computing environment 116 may each send compute advertisement packets 118 to the constrained device 106 where the compute advertisements 118 indicate availabilities of computing resources and one or more performance metrics 304.

At 408, the constrained device 106 may select an offload device based on the performance metrics 304. For instance, the constrained device 106 may determine that one of the offload devices 108A and 108B or the edge computing environment 116 has an availability of a computing resource that is optimal for the process(es) being offloaded, and/or a performance metric that satisfies a service level agreement (SLA) or requirement of the process(es).

At 410, the constrained device 106 may perform techniques for verifying the bootloader and confidential compute environment 410 with the selected offload device 108A. For instance, the devices may perform one or more remote attestation methods after establishing the connect in order to verify security and/or performance attributes of the offload device 108A (and potentially the constrained device 106).

At 412, the constrained device 106 and the offload device 108A may establish a mutually authenticated secure channel 412, such as by using Diffie-Hellman key exchange over the connections. The key(s) exchanged during this exchange method may then be used to encrypt subsequent communications (e.g., using a symmetric-key cipher) such that any processes or data exchanged between the devices are secure and not visible to parties other than the offload device 108 and constrained device 106.

At 414, and using this secure channel, the offload device 108 may dynamically load an application from the constrained device 108 (or locally/from another external device) and run that application to process data on behalf of the constrained device 106. At 416, the constrained device 106 may provide data for the process(es) running in the confidential compute 110 (depending on the processes being run). The devices may maintain the secure channel and pass data back-and-forth depending on the type of process and/or data that is offloaded from the constrained device and to the offload device. In some instances, the attestable bootloader may allow more than one trusted user to use the same confidential application if requested by the different constrained devices.

Optionally, at 418, the offload device 108A may store data in persistent storage of the offload device 108A for later use when running processes on behalf of the constrained device 106 and/or as a backup storage source for the constrained device 106.

Figure 5:
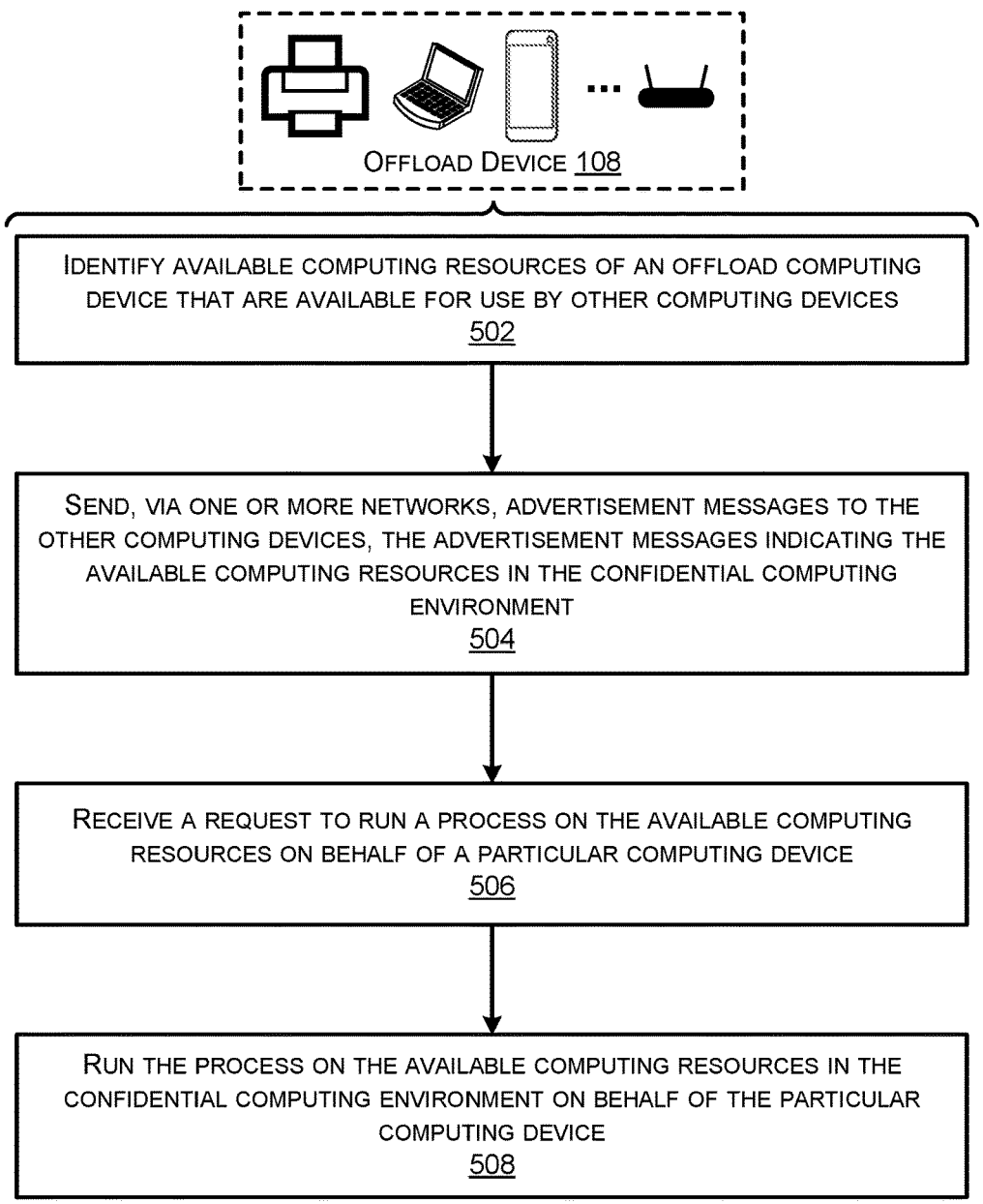
FIG. 5 illustrates a flow diagram of an example method for an offload device to advertise available computing resources in a confidential computing environment, and run a process on behalf of a computing device in the confidential computing environment.
Figure 6:
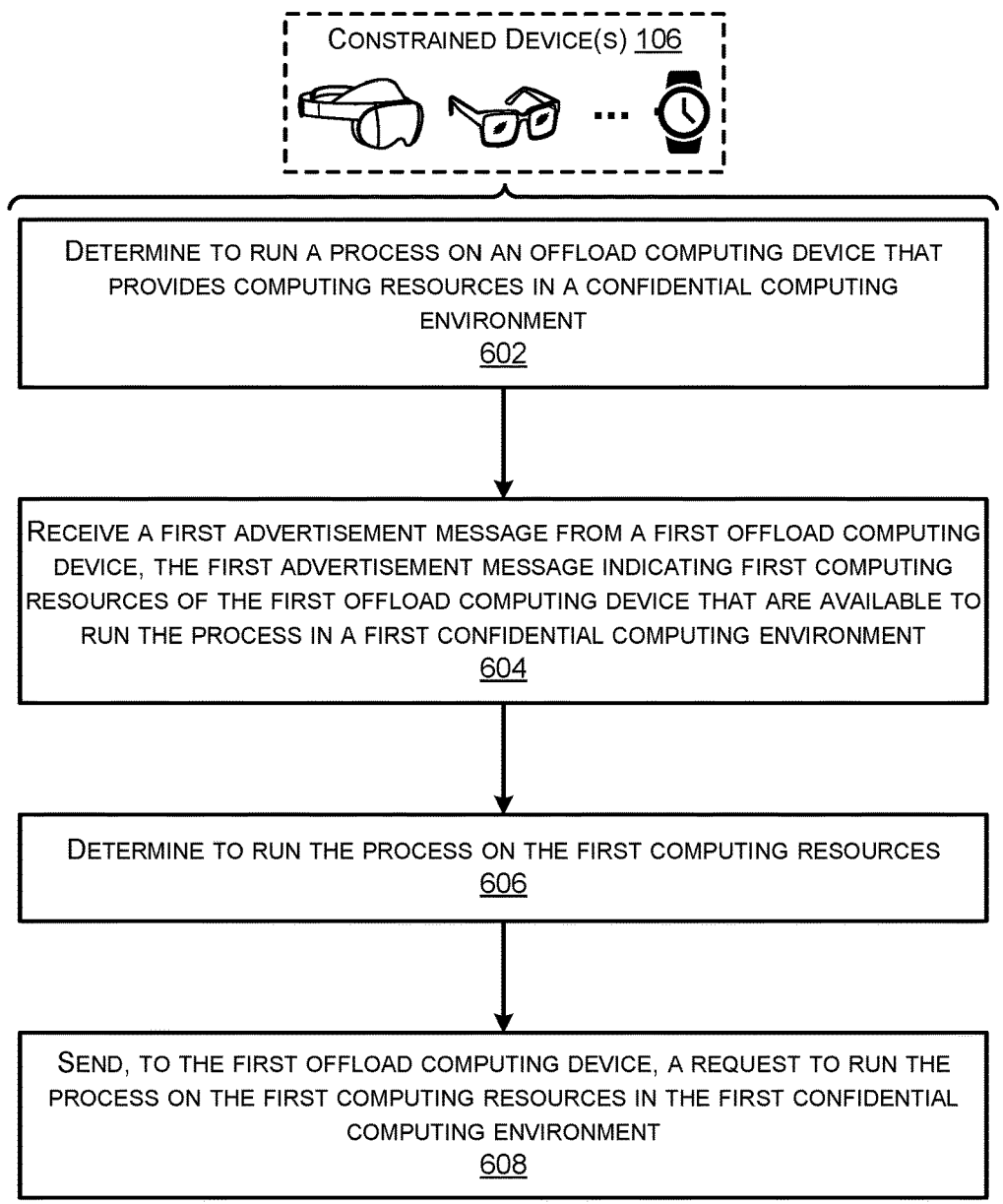
FIG. 6 illustrates a flow diagram of an example method for a computing device to determine to run a process on computing resources of an offload device in a confidential computing environment.

FIGS. 5 and 6 illustrate flow diagrams of example methods 500 and 600 that illustrate aspects of the functions performed at least partly by the devices in the distributed application architecture as described in FIGS. 1-4B. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, or different arrangements of components.

FIG. 5 illustrates a flow diagram of an example method 500 for an offload device 108 to advertise available computing resources in confidential compute 110, and run a process on behalf of a computing device in the confidential computing environment.

At 502, the offload device 108 may identify available computing resources of the offload computing device that are available for use by the other computing devices. For instance, the attestable loader 202 may determine an availability of computing resources (not being used by other processes) of the offload device 108, such as CPU 210, memory 206, storage 208, networking availability, and/or GPU.

At 504, the offload device 108 may send, via one or more networks, advertisement messages to the other computing devices where the advertisement messages indicating the available computing resources in the confidential computing environment.

At 506, the offload device 108 may receive a request to run a process on the available computing resources on behalf of a particular computing device. At 508, the offload device 108 may run the process on the available computing resources in the confidential computing environment on behalf of the particular computing device.

FIG. 6 illustrates a flow diagram of an example method 600 for a computing device to determine to run a process on computing resources of an offload device 108 in a confidential computing environment.

At 602, the computing device (e.g., constrained device 106) may determine to run a process on an offload computing device 108 that provides computing resources in a confidential computing environment (e.g., confidential compute 110). At 604, the computing device may receive a first advertisement message 118 from a first offload computing device 108A where the first advertisement message 118 indicates first computing resources of the first offload computing device 108A that are available to run the process in a first confidential computing environment (e.g., confidential compute 110).

At 606, the computing device may determine to run the process on the first computing resources of the first offload computing device 108A, and at 608, the computing device may send, to the first offload computing device 108A, a request to run the process on the first computing resources in the first confidential computing environment (e.g., confidential compute 110).

In some examples, the method 600 may further include receiving a second advertisement message from a second offload computing device where the second advertisement message indicates second computing resources of the second offload computing device that are available to run the process, and receiving a second performance metric associated with use of the second confidential computing environment. Further, the method 600 may include determining to run the process on the first computing resources of the first offload computing device rather than the second computing resources of the second offload computing device based at least in part on the first and second performance metrics.

Figure 7:
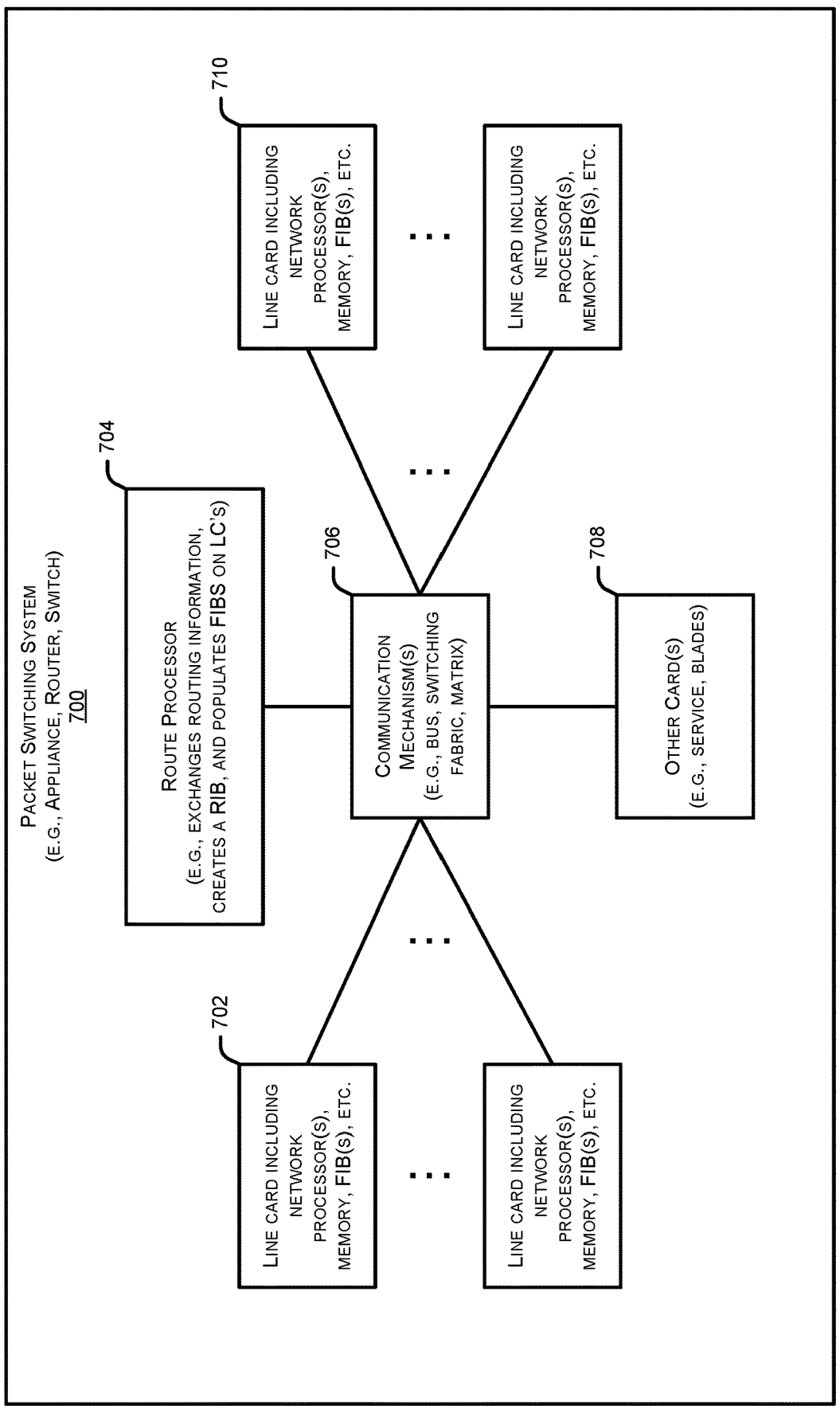
FIG. 7 illustrates a block diagram illustrating an example packet switching system that can be utilized to implement various aspects of the technologies disclosed herein.

FIG. 7 illustrates a block diagram illustrating an example packet switching device (or system) 700 that can be utilized to implement various aspects of the technologies disclosed herein. In some examples, packet switching device(s) 700 may be employed in various networks, such as, for example, network(s) 112, 120, and/or other networks as described with respect to FIG. 1. The packet switching device(s) 700 may be an example of an offload device 108 as described herein.

In some examples, a packet switching device 700 may comprise multiple line card(s) 702, 710, each with one or more network interfaces for sending and receiving packets over communications links (e.g., possibly part of a link aggregation group). The packet switching device 700 may also have a control plane with one or more processing elements 704 for managing the control plane and/or control plane processing of packets associated with forwarding of packets in a network. The packet switching device 700 may also include other cards 708 (e.g., service cards, blades) which include processing elements that are used to process (e.g., forward/send, drop, manipulate, change, modify, receive, create, duplicate, apply a service) packets associated with forwarding of packets in a network. The packet switching device 700 may comprise hardware-based communication mechanism 706 (e.g., bus, switching fabric, and/or matrix, etc.) for allowing its different entities 702, 704, 708 and 710 to communicate. Line card(s) 702, 710 may typically perform the actions of being both an ingress and/or an egress line card 702, 710, in regard to multiple other particular packets and/or packet streams being received by, or sent from, packet switching device 700.

Figure 8:
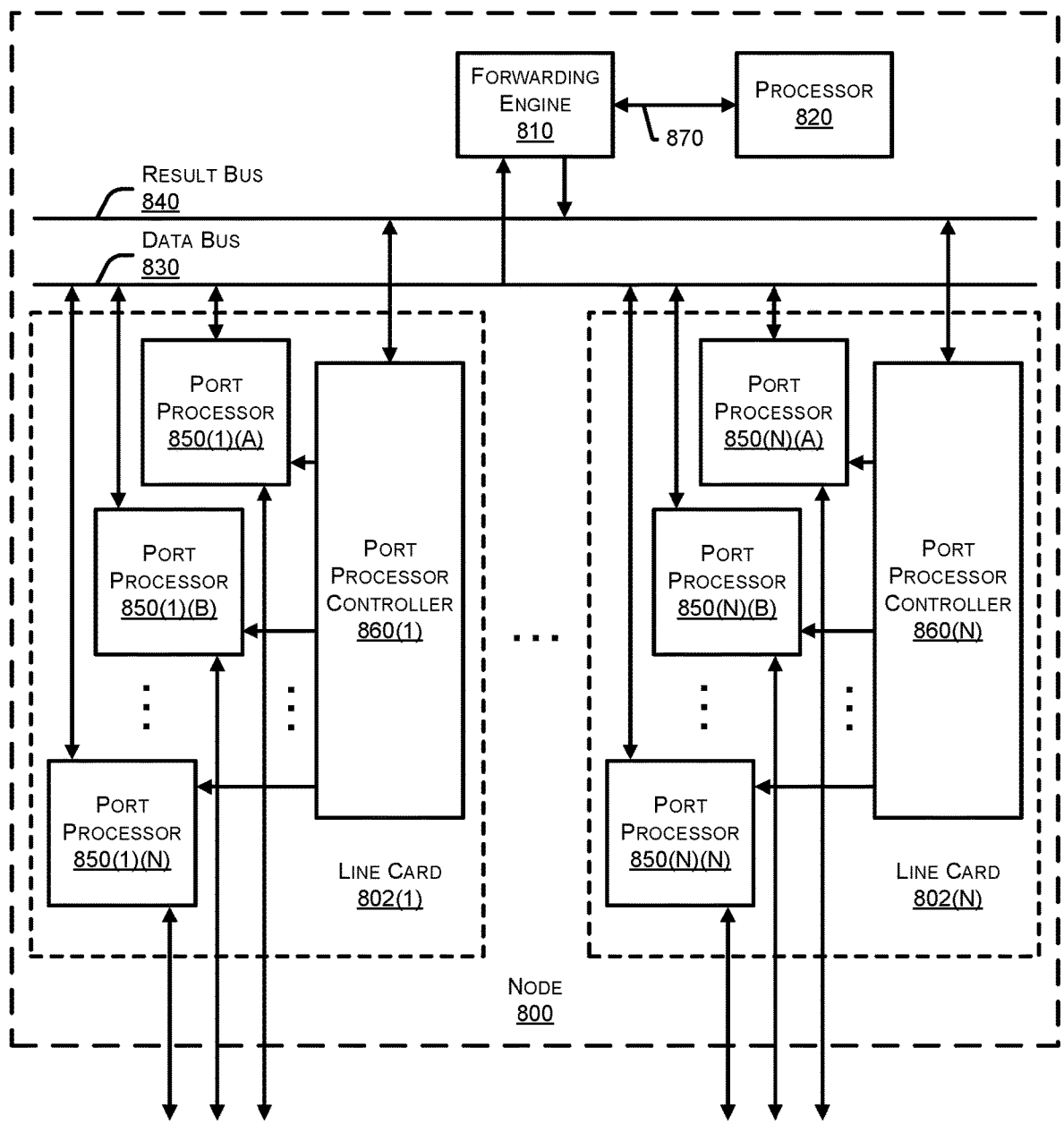
FIG. 8 illustrates a block diagram illustrating certain components of an example node that can be utilized to implement various aspects of the technologies disclosed herein.

FIG. 8 illustrates a block diagram illustrating certain components of an example node 800 that can be utilized to implement various aspects of the technologies disclosed herein. In some examples, node(s) 800 may be employed in various networks, such as, for example, network(s) 112, 120, and/or other networks as described with respect to FIG. 1. The packet switching device(s) 700 may be an example of an offload device 108 as described herein.

In some examples, node 800 may include any number of line cards 802 (e.g., line cards 802(1)-(N), where N may be any integer greater than 1) that are communicatively coupled to a forwarding engine 810 (also referred to as a packet forwarder) and/or a processor 820 via a data bus 830 and/or a result bus 840. Line cards 802(1)-(N) may include any number of port processors 880(1)(A)-(N)(N) which are controlled by port processor controllers 860(1)-(N), where N may be any integer greater than 1. Additionally, or alternatively, forwarding engine 810 and/or processor 820 are not only coupled to one another via the data bus 830 and the result bus 840, but may also communicatively coupled to one another by a communications link 870.

The processors (e.g., the port processor(s) 880 and/or the port processor controller(s) 860) of each line card 802 may be mounted on a single printed circuit board. When a packet or packet and header are received, the packet or packet and header may be identified and analyzed by node 800 (also referred to herein as a router) in the following manner. Upon receipt, a packet (or some or all of its control information) or packet and header may be sent from one of port processor(s) 880(1)(A)-(N)(N) at which the packet or packet and header was received and to one or more of those devices coupled to the data bus 830 (e.g., others of the port processor (s) 880(1)(A)-(N)(N), the forwarding engine 810 and/or the processor 820). Handling of the packet or packet and header may be determined, for example, by the forwarding engine 810. For example, the forwarding engine 810 may determine that the packet or packet and header should be forwarded to one or more of port processors 880(1)(A)-(N)(N). This may be accomplished by indicating to corresponding one(s) of port processor controllers 860(1)-(N) that the copy of the packet or packet and header held in the given one(s) of port processor(s) 880(1)(A)-(N)(N) should be forwarded to the appropriate one of port processor(s) 880(1)(A)-(N)(N). Additionally, or alternatively, once a packet or packet and header has been identified for processing, the forwarding engine 810, the processor 820, and/or the like may be used to process the packet or packet and header in some manner and/or may add packet security information in order to secure the packet. On a node 800 sourcing such a packet or packet and header, this processing may include, for example, encryption of some or all of the packet's or packet and header's information, the addition of a digital signature, and/or some other information and/or processing capable of securing the packet or packet and header. On a node 800 receiving such a processed packet or packet and header, the corresponding process may be performed to recover or validate the packet's or packet and header's information that has been secured.

Figure 9:
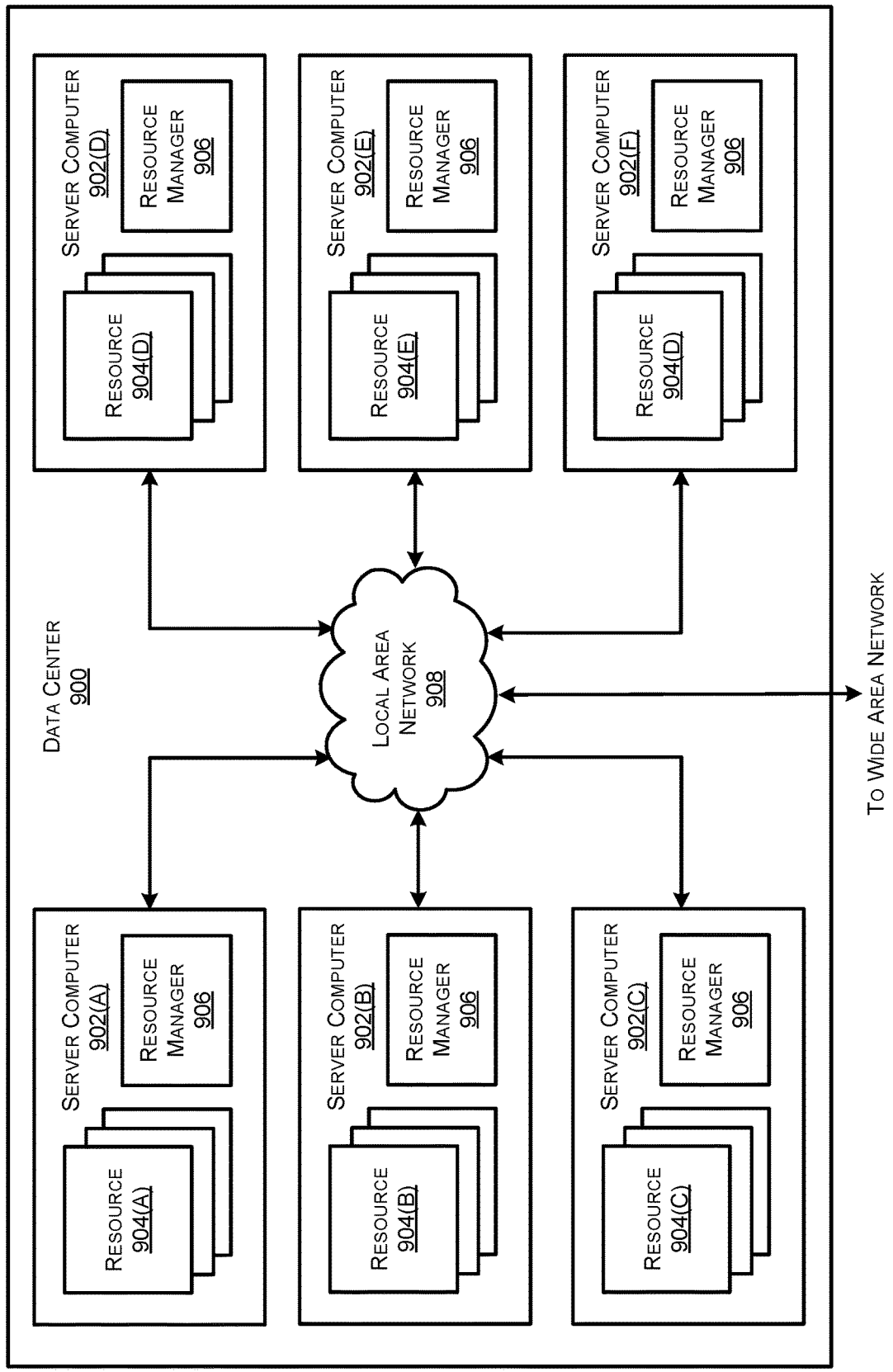
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several computers 902A-902F (which might be referred to herein singularly as "a computer 902" or in the plural as "the computers 902") for providing computing resources. In some examples, the resources and/or computers 902 may include, or correspond to, the any type of networked device described herein. Although described as servers, the computers 902 may comprise any type of networked device, such as servers, switches, routers, hubs, bridges, gateways, modems, repeaters, access points, etc.

In some instances, the data center 900 may be an example of the edge computing environment 116 or include or correspond to other offload devices 108 as described herein.

The computers 902 can be standard tower, rack-mount, or blade server computers configured appropriately for providing computing resources. In some examples, the computers 902 may provide computing resources 904 including data processing resources such as VM instances or hardware computing systems, database clusters, computing clusters, storage clusters, data storage resources, database resources, networking resources, and others. Some of the computers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single computer 902. The computers 902 in the data center 900 can also be configured to provide network services and other types of services.

In the example data center 900 shown in FIG. 9, an appropriate LAN 908 is also utilized to interconnect the computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the computers 902A-902F in each data center 900, and, potentially, between computing resources in each of the computers 902. It should be appreciated that the configuration of the data center 900 described with reference to FIG. 9 is merely illustrative and that other implementations can be utilized.

In some examples, the computers 902 may each execute one or more application containers and/or virtual machines to perform techniques described herein.

In some instances, the data center 900 may provide computing resources, like application containers, VM instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like application containers and VM instances, data storage resources, networking resources, data communication resources, network services, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 10.

Figure 10:
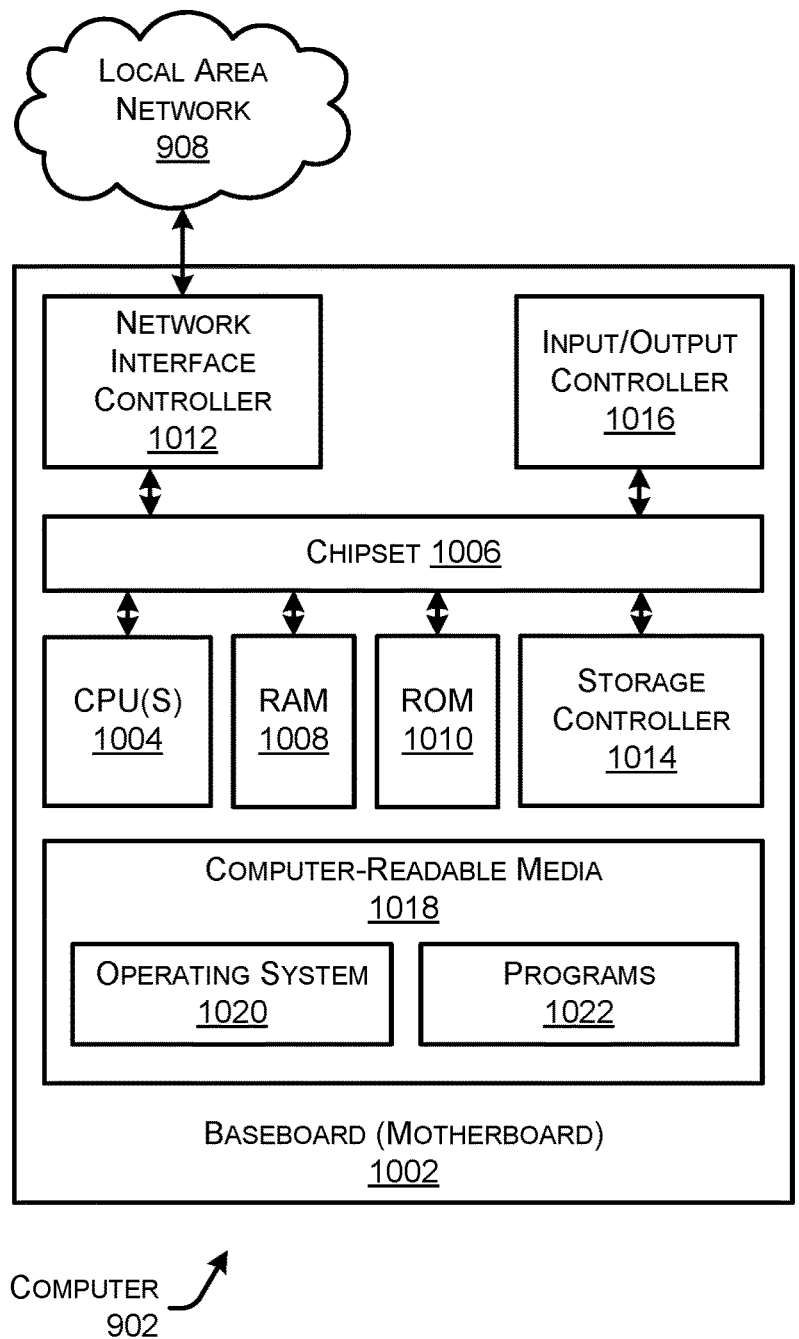
FIG. 10 is a computer architecture diagram showing an illustrative computer hardware architecture for implementing a computing device that can be utilized to implement aspects of the various technologies presented herein.

FIG. 10 shows an example computer architecture for a computer 902 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computer 902 may, in some examples, correspond to an offload device 108 described herein, and may comprise networked devices such as servers, switches, routers, hubs, bridges, gateways, modems, repeaters, access points, etc.

The computer 902 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 902. The chipset 1006 can further provide an interface to a computer-readable storage medium such as a read-only memory ("ROM") 1010 or non-volatile RAM ("NVRAM") for storing basic routines that help to startup the computer 902 and to transfer information between the various components and devices. The ROM 1010 or NVRAM can also store other software components necessary for the operation of the computer 902 in accordance with the configurations described herein.

The computer 902 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 902 to other computing devices over the network 908 (and/or 102). It should be appreciated that multiple NICs 1012 can be present in the computer 902, connecting the computer to other types of networks and remote computer systems.

The computer 902 can be connected to a storage device 1018 that provides non-volatile storage for the computer. The storage device 1018 can store an operating system 1020, programs 1022, and data, which have been described in greater detail herein. The storage device 1018 can be connected to the computer 902 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 902 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 902 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 can further read information from the storage device 1018 by detecting the physical states or characteristics of one or more particular locations within the physical storage units.

In addition to the mass storage device 1018 described above, the computer 902 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 902.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 902. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computer 902.

In one embodiment, the storage device 1018 or other computer-readable storage media is encoded with computer-executable instructions which, when loaded into the computer 902, transform the computer from a general-purpose computing system into a special-purpose computer capable of implementing the embodiments described herein. These computer-executable instructions transform the computer 902 by specifying how the CPUs 1004 transition between states, as described above. According to one embodiment, the computer 902 has access to computer-readable storage media storing computer-executable instructions which, when executed by the computer 902, perform the various processes described above with regard to FIGS. 1-6. The computer 902 can also include computer-readable storage media having instructions stored thereupon for performing any of the other computer-implemented operations described herein.

The computer 902 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An offload computing device that provides computing resources in a confidential computing environment for use by other computing devices, the offload computing device comprising:
   one or more processors; and
   one or more non-transitory computer-readable media storing computer-executable instructions that, when executed by the one or more processors, cause the one or more processors to perform operations comprising:
   identifying available computing resources of the offload computing device that are available for use by the other computing devices;
   executing an attestable bootloader in the confidential computing environment of the offload computing device, wherein the attestable bootloader manages processes running in the confidential computing environment;
   sending, via one or more networks, advertisement messages to the other computing devices, the advertisement messages indicating the available computing resources in the confidential computing environment;
   receiving a request to run a process on the available computing resources on behalf of a particular computing device;
   verifying, to the particular computing device, that the attestable bootloader is trustable to manage execution of the process; and
   running, at least partly by the attestable bootloader, the process on the available computing resources in the confidential computing environment on behalf of the particular computing device.

2. The offload computing device of claim 1, the operations further comprising:
   launching, by the attestable bootloader, the confidential computing environment on the offload computing device using a hardware-based security technology.

3. The offload computing device of claim 1, the operations further comprising:
   establishing, at least partly by the attestable bootloader running on the offload computing device, a secure encrypted channel over the one or more networks with the particular computing device; and receiving, via the secure encrypted channel, data from the particular computing device that is to be used by the process running on the offload computing device.

4. The offload computing device of claim 3, wherein the secure encrypted channel is a mutually authenticated secure channel establishing using one or more cryptographic keys, the operations further comprising:
   storing, using the one or more cryptographic keys, additional data associated with the particular computing device in persistent storage after execution of the process has ended; and
   encrypting the additional data using the one or more cryptographic keys such that the additional data is stored in an encrypted format.

5. The offload computing device of claim 1, the operations further comprising:
   receiving, from the particular computing device, a second request to verify an exact binary identity of the attestable bootloader that manages the process running in the confidential computing environment,
   wherein verifying that the attestable bootloader is trustable comprises, using remote attestation, proving the exact binary identity of the attestable bootloader and that the attestable bootloader is running in the confidential computing environment.

6. The offload computing device of claim 1, the operations further comprising:
   determining a performance metric associated with use of the confidential computing environment, the performance metric including at least one of:
      a bandwidth metric for a connection between the offload computing device and the particular computing device;
      a latency metric for the connection between the offload computing device and the particular computing device;
      a central processing unit (CPU) speed metric of a processor supporting the confidential computing environment;
      a security metric indicating a measure of security of the confidential computing environment; or
      an indication of libraries of confidential code loadable by the offload computing device; and
   providing the performance metric to the particular computing device.

7. The offload computing device of claim 6, the operations further comprising, prior to running the process:
   receiving, from the particular computing device, a second request to provide an indication of the performance metric; and
   in response to receiving the second request, sending the indication of the performance metric to the particular computing device.

8. A method performed by an offload computing device that provides computing resources in a confidential computing environment for use by other computing devices, the method comprising:
   identifying available computing resources of the offload computing device that are available for use by the other computing devices;
   executing an attestable bootloader in the confidential computing environment of the offload computing device, wherein the attestable bootloader manages processes running in the confidential computing environment;
   sending, via one or more networks, advertisement messages to the other computing devices, the advertisement messages indicating the available computing resources in the confidential computing environment;
   receiving a request to run a process on the available computing resources on behalf of a particular computing device;
   verifying, to the particular computing device, that the attestable bootloader is trustable to manage execution of the process; and
   running the process on the available computing resources in the confidential computing environment on behalf of the particular computing device.

9. The method of claim 8, further comprising:
   launching, by the attestable bootloader, the confidential computing environment on the offload computing device using a hardware-based security technology.

10. The method of claim 8, further comprising:
   establishing, at least partly by the attestable bootloader running on the offload computing device, a secure encrypted channel over the one or more networks with the particular computing device; and
   receiving, via the secure encrypted channel, data from the particular computing device that is to be used by the process running on the offload computing device.

11. The method of claim 10, wherein the secure encrypted channel is a mutually authenticated secure channel establishing using one or more cryptographic keys, further comprising:
   storing, using the one or more cryptographic keys, additional data associated with the particular computing device in persistent storage after execution of the process has ended; and
   encrypting the additional data using the one or more cryptographic keys such that the additional data is stored in an encrypted format.

12. The method of claim 8, further comprising:
   receiving, from the particular computing device, a second request to verify an exact binary identity of the attestable bootloader that manages the process running in the confidential computing environment,
   wherein verifying that the attestable bootloader is trustable comprises, using remote attestation, proving the exact binary identity of the attestable bootloader and that the attestable bootloader is running in the confidential computing environment.

13. The method of claim 8, further comprising:
   determining a performance metric associated with use of the confidential computing environment, the performance metric including at least one of:
   a bandwidth metric for a connection between the offload computing device and the particular computing device;
   a latency metric for the connection between the offload computing device and the particular computing device;
   a central processing unit (CPU) speed metric of a processor supporting the confidential computing environment;
   a security metric indicating a measure of security of the confidential computing environment; or
   an indication of libraries of confidential code loadable by the offload computing device; and
   providing the performance metric to the particular computing device.

14. The method of claim 13, further comprising, prior to running the process:
   receiving, from the particular computing device, a second request to provide an indication of the performance metric; and in response to receiving the second request, sending the indication of the performance metric to the particular computing device.

15. A computing device comprising:
one or more processors; and
one or more non-transitory computer-readable media storing computer-executable instructions that, when executed by the one or more processors, cause the one or more processors to perform operations comprising:
determining to run a process on an offload computing device that provides computing resources in a confidential computing environment;
receiving a first advertisement message from a first offload computing device, the first advertisement message indicating first computing resources of the first offload computing device that are available to run the process in a first confidential computing environment;
determining that an attestable bootloader is managing processes running in the first confidential computing environment of the first offload computing device;
verifying that the attestable bootloader is trustable to manage execution of the process; and
determining to run the process on the first computing resources; and
sending, to the first offload computing device, a request to run the process on the first computing resources in the first confidential computing environment.

16. The computing device of claim 15, the operations further comprising:
receiving a first performance metric associated with use of the first confidential computing environment, the first performance metric including at least one of:
a bandwidth metric for a connection between the first offload computing device and the computing device;
a latency metric for the connection between the first offload computing device and the computing device;
a central processing unit (CPU) speed metric of a processor supporting the first confidential computing environment;
a security metric indicating a first measure of security of the first confidential computing environment; or
an indication of libraries of confidential code loadable by the first offload computing device; and
determining to run the process on the first computing resources based at least in part on the first performance metric.

17. The computing device of claim 16, the operations further comprising:
receiving a second advertisement message from a second offload computing device, the second advertisement message indicating second computing resources of the second offload computing device that are available to run the process;
receiving a second performance metric associated with use of a second confidential computing environment of the second offload computing device; and
determining to run the process on the first computing resources of the first offload computing device rather than the second computing resources of the second offload computing device based at least in part on the first and second performance metrics.

18. The computing device of claim 15, further comprising:
establishing, at least partly with the attestable bootloader running on the first offload computing device, a secure encrypted channel over one or more networks with the first offload computing device; and
sending, via the secure encrypted channel, data to the first offload computing device that is to be used by the process running on the first offload computing device.

19. The computing device of claim 18, wherein:
the secure encrypted channel is a mutually authenticated secure channel establishing using one or more cryptographic keys; and
additional data associated with the process is stored in persistent storage of the first offload computing device after execution of the process has ended in an encrypted format using the one or more cryptographic keys.

20. The computing device of claim 18, the operations further comprising:
sending, to the first offload computing device, a second request to verify an exact binary identity of the attestable bootloader that manages the process running in the first confidential computing environment,
wherein verifying that the attestable bootloader is trustable comprises, using remote attestation, receiving proof the exact binary identity of the attestable bootloader and that the attestable bootloader is running in the first confidential computing environment.

* * * * *